2,918,436

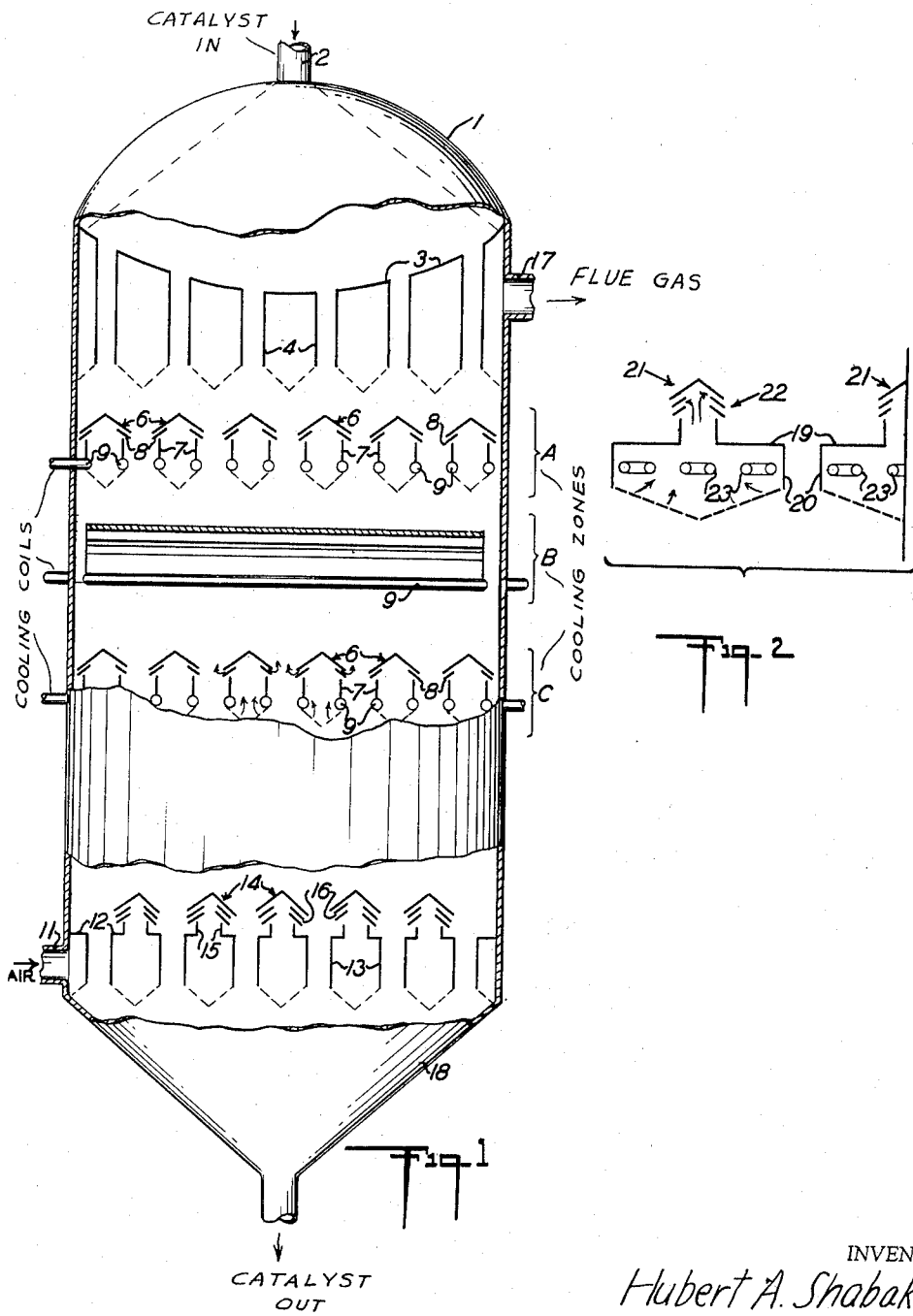

TEMPERATURE CONTROL OF EXOTHERMIC REACTIONS

Hubert A. Shabaker, Media, Pa., assignor to Houdry Process Corporation, Wilmington, Del., a corporation of Delaware Original application May 4, 1951, Serial No. 224,592, now Patent No. 2,816,010, dated December 10, 1957. Divided and this application February 25, 1957, Serial No. 642,312

1 Claim. (Cl. 252—418)

This invention relates to the regeneration of catalyst employed in the cracking of hydrocarbons, and more particularly to the control of the temperature developed during the catalyst regeneration.

As is known by those familiar with the art of cracking hydrocarbons, one commercially successful method is to employ a continuously recycled catalyst. In systems of this type, the catalyst is contacted with hydrocarbons at suitable temperatures to insure cracking. During the cracking stage a hydrocarbonaceous deposit, called "coke," is formed in the catalyst, tending to reduce the catalytic activity. In order to accomplish efficient cracking, it is necessary to remove the coke from the catalyst, which is generally done by passing the catalyst containing the coke through a regenerator. During the regeneration stage, the catalyst is treated with an oxidizing gas, preferably air, at suitable temperature to burn off the coke, leaving relatively coke free catalyst which may be recycled to the reactor stage for further contact with hydrocarbons to be cracked. As a result of the combustion between the oxygen of the air and the coke, temperatures in the regenerator, if not controlled, may go as high as 1700–2000° F. or higher, depending upon the degree of combustion. It has been found that when catalysts employed in cracking processes are subjected to temperatures above about 1100° to 1300° F., they undergo degradation and loss of activity. It is also known that excessive temperatures within a kiln will tend to warp and burn elements of the kiln structure.

It is a primary object of the present invention to control the temperature developed in a regenerator kiln to within those limits which will prevent catalyst degradation and kiln structure deterioration.

Another object is the provision of a new and novel method and apparatus for reducing the heat content of the materials moving within the kiln.

The invention, then, comprises the features hereinafter fully described and as particularly pointed out in the claim, the following description and annexed drawings setting forth in detail certain illustrative embodiments of the invention, these being indicative of but one of a number of ways in which the principles of the invention may be employed.

In said drawings:

Figure 1 is an elevational view, partly in diagram and partly in section, of a regenerator kiln employing the teachings of the present invention; and Figure 2 is a diagrammatic elevation of the apparatus of a modified cooling zone.

Referring more particularly to Figure 1, the numeral 1 designates the housing of a catalyst regenerator or kiln having a catalyst supply line 2. Uniform distribution across the interior of the kiln of the incoming catalyst is provided by a transverse concave tube sheet 3 having a plurality of downcomers 4. Positioned below the downcomers 4 is an upper cooling zone A which is provided with a plurality of inverted channel-shaped members 6 disposed in adjacent parallelism.

Each of the inverted channel-shaped members 6 comprises an inverted V-shaped top element with a pair of depending and substantially parallel side-walls 7, the latter being provided with suitable louvers 8. Also employed in the cooling zone A is a cooling coil 9 which extends transversely of the housing of the regenerator and which, according to a permissive embodiment, is attached to the lower ends of the side-walls 7 of the inverted channel-shaped members 6.

A plurality of such cooling zones may be provided in the regenerator, depending on operating conditions. In the preferred embodiment each successive cooling zone has its elements disposed at right angles to the disposition of the elements of the next adjacent zone. Successively lower second and third cooling zones are designated in Figure 1 at B and C, respectively.

Air or other oxidizing gas is supplied to the regenerator kiln through line 11. Positioned slightly above the air inlet, there is shown a transverse tube sheet 12 provided with a plurality of downcomers 13. Extending upwardly from the tube sheet 12, there is shown a plurality of inverted channel-shaped members 14 which are disposed in adjacent parallelism. As shown in Figure 1, each of these inverted channel-shaped members 14 comprises an inverted V-shaped top element with a pair of depending and substantially parallel side-walls 15, each of the latter having suitable louvers 16 for permitting the egress of upwardly flowing gas. Withdrawing of gas from the regenerator is effected by means of a suitable outlet 17; and the regenerated catalyst is discharged through an inverted frusto-conical bottom portion 18.

In Figure 2 of the drawings a modified cooling zone is shown as comprising a transverse plate 19 having a plurality of downcomers 20. Extending upwardly from the transverse plate 19 is a plurality of inverted channel-shaped members 21, each of which comprises an inverted V-shaped top element with a pair of depending and substantially parallel side-walls, the latter being provided with suitable louvers 22 for enabling the egress of upwardly flowing gas.

According to the foregoing construction and arrangement, a chamber is formed beneath those portions of the transverse plate 19 which underlie the inverted channel-shaped members 21; and each of these chambers is provided with a coil 23 which is supplied with a suitable cooling medium such as steam, etc.

In operation: spent catalyst from a cracking stage enters the regenerator kiln through supply pipe 2 and rests temporarily on the transverse concave tube sheet 3. From the top of the tube sheet 3 the spent catalyst descends by gravity through downcomers 4 passing downwardly through the regenerator kiln in the form of a moving bed for ultimate discharge in a regenerated condition through the inverted frusto-conical bottom portion 18.

In order to remove the coke present on the spent catalyst, it is passed countercurrent with an oxidizing gas, preferably air, which enters through the line 11 and flows upwardly through the downwardly moving catalyst bed, the products of combustion being discharged from the regenerator through the aforementioned gas discharge outlet 17.

The air introduced to the regenerator through the gas line 11, and which may be at ambient temperature, enters the space immediately below the tube sheet 12 having the downcomers 13, and passes upwardly into the horizontally disposed adjacently parallel inverted channel-shaped members 14 from which it diffuses outwardly through the louvers 16 into the downwardly moving catalyst bed. The catalyst which has attained a relatively high temperature prior to entering this zone, now gives up a portion of its heat to the incoming air and is thereby cooled. The air continues upwardly through the catalyst bed oxidizing the coke and thereby picking up additional heat along with gaseous products of combustion. As previously mentioned, this accumulated heat produces certain undesirable results which the present invention overcomes by a separate cooling medium which removes the heat by passing in indirect heat exchange relationship with both the downwardly moving catalyst and the upwardly moving gas.

This cooling of the materials flowing in the regenerator is accomplished in zones A, B, and C. While three zones are shown in this particular embodiment, it is to be understood that any number of the zones may be employed consistent with the practical aspects and the desired results within a similar system.

The particular structure and operation of the embodiments herein described are of such nature that the pressure drop conditions existing directly beneath and within the inverted channel members 6 are appreciably less than the pressure drop status existing between and through adjacent channel members 6 so that in the normal course of flow of the rising gas the tendency of such gas is to seek these regions of lower pressure drop and thus flow into the channel members and subsequently out through the louvers 8 into a higher region of the gravitating bed of solids. The distinct advantage of this system over other systems wherein solids and gases without separation pass over a multiplicity of stacked heat exchange members lies mainly in the ability of the gas to move within the solids free region under the channel members in suitable heat exchange relation with cooling coils 9 in such fashion that appreciable temperature reduction of the gas is obtained. In the non-separated cooling set-up where catalyst and gas are commingled, this free movement of gas to obtain efficient heat exchange is obstructed to an appreciable extent by the presence of the solids; likewise the solid particles themselves have relatively poor heat exchange ability with themselves and the effect of heat exchange between solid particles adjacent the heat exchange coils is very poorly transmitted to solid particles not so adjacent.

The gases, thus cooled, upon introduction into the gravitating bed of solids are distributed relatively uniformly and rapidly throughout the catalyst thereabove and effect more efficient direct heat transfer with the solids through the intimate contact therewith than previously possible in the non-segregated system. However, the other system is not without some advantage which may likewise accrue with the present operation in that at least a portion of the catalyst passes in direct contact with heat exchange members 9 thereby obtaining an additional amount of temperature reduction in connection with total operation of the cooling zone. It may be noted likewise that due to the pressure drop conditions hereinabove described, little if any flow of gas occurs through the catalyst moving between the gas reintroduction level adjacent louvers 8 and the lower ends of the channel members 6. By discontinuing the flow of gases through the catalyst in this region, the combustion practically ceases or is reduced to a low level thus obviating any substantial rise in temperature and thus materially aiding in the prevention of excessive temperatures within the regeneration zone.

Referring to the modification of Figure 2, the upwardly flowing gases at elevated temperatures are separated from the downwardly moving catalyst bed and enter the space immediately below the transverse plate or partition 19 free of solids. It will thus be seen that only the gases are passed in heat exchange relationship with the cooling means 23, the catalyst flowing downwardly through downcomers 20 without contacting the coils. Following their entrance into the spaces provided with the cooling coils 23, the gases at a reduced temperature flow upwardly into the inverted channel-shaped members 21 and then outwardly into the catalyst through the louvers 22.

Various other modifications may be made without departing from the spirit and scope of the instant invention which is intended to be limited only by the following claims.

The present application is a division of my application Serial No. 224,592, filed May 4, 1951, now U.S. Patent No. 2,816,010.

I claim:

In the method of regenerating catalyst contaminated with coke, in which such regeneration is effected by flowing an oxidizing gas upwardly through a downwardly moving compact bed of said contaminated catalyst to oxidize the coke present therein, the improvement for controlling regeneration temperature which comprises: subjecting said downwardly flowing bed of catalyst to successive cooling stages wherein in at least two of said stages the catalyst is cooled by indirect heat exchange in spaced apart regions in its path of flow and in the absence of substantial gas flow and wherein additional cooling of the downwardly flowing catalyst bed is effected between said spaced apart regions by direct upward flow therethrough of a pre-cooled gas, said pre-cooled gas being obtained by flowing the oxidizing gas in indirect heat-exchange relation with a cooling medium during a portion of the aforesaid upward flow and while said gas is free of contact with catalyst.

References Cited in the file of this patent

UNITED STATES PATENTS

| 2,444,990 | Hemminger | July 13, 1948 |
| 2,459,425 | Hemminger | Jan. 18, 1949 |
| 2,578,670 | Carleton | Dec. 18, 1951 |